United States Patent
Osborn et al.

(10) Patent No.: US 11,699,151 B2
(45) Date of Patent: *Jul. 11, 2023

(54) BODY AREA NETWORK FACILITATED AUTHENTICATION OR PAYMENT AUTHORIZATION

(71) Applicant: Capital One Services, LLC, McLean, VA (US)

(72) Inventors: Kevin Osborn, Newton, MA (US); Jeffrey Rule, Chevy Chase, MD (US); David Wurmfeld, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 377 days.

This patent is subject to a terminal disclaimer.

(21) Appl. No.: 16/907,536

(22) Filed: Jun. 22, 2020

(65) Prior Publication Data

US 2021/0019744 A1   Jan. 21, 2021

Related U.S. Application Data

(63) Continuation of application No. 16/514,978, filed on Jul. 17, 2019, now Pat. No. 10,733,601.

(51) Int. Cl.
*G06Q 20/38* (2012.01)
*G06Q 20/32* (2012.01)
*G06Q 20/40* (2012.01)

(52) U.S. Cl.
CPC ... *G06Q 20/38215* (2013.01); *G06Q 20/3227* (2013.01); *G06Q 20/3825* (2013.01); *G06Q 20/401* (2013.01); *G06Q 2220/00* (2013.01)

(58) Field of Classification Search
CPC ......... G06Q 20/38215; G06Q 20/3227; G06Q 20/3825; G06Q 20/401; G06Q 2220/00

(Continued)

(56) References Cited

U.S. PATENT DOCUMENTS 7,352,996 B2 * 4/2008 Kumar ................ H04L 63/0853
455/100
2003/0184430 A1 * 10/2003 Kumar ................ G06Q 20/327
340/5.74

(Continued)

FOREIGN PATENT DOCUMENTS

EP    1351112 A2 * 10/2003 ............. G06F 21/35
EP    1351112 A2    10/2003

OTHER PUBLICATIONS

* Holz et al, Biometric Touch Sensing: Seamlessly Augmenting Each Touch with Continuous Authentication, UIST '15, Nov. 8-11, 2015, 10 pages (Year: 2015).*

(Continued)

*Primary Examiner* — James D Nigh
(74) *Attorney, Agent, or Firm* — KDW Firm PLLC

(57) ABSTRACT

Disclosed are examples of a method, a wearable device and a system enabling authentication of a user of a payment account or completion of a purchase transaction via signals generated by the wearable device. A process may include a wearable device generating a modulated signal using an encryption algorithm. The modulated signal may contain authentication information related to the wearable device including a cryptographic authentication message. The modulated signal is output to a biological medium interface of the wearable device that is coupled to a biological medium of a wearer of the wearable device. The biological medium is operable to conduct the modulated signal. A receiving device processes including decrypting and demodulating the modulated signal received from the biological medium. Using the demodulated signal, the authentication information transmitted from the wearable device is obtained. Based on the obtained authentication information, a transaction may be authorized, or a user authenticated.

13 Claims, 6 Drawing Sheets

(58) Field of Classification Search
USPC .......................................................... 705/75
See application file for complete search history.

(56) References Cited

U.S. PATENT DOCUMENTS

| 2015/0089585 A1* | 3/2015 | Novack | .................. | H04L 63/08 |
| | | | | 726/3 |
| 2015/0149310 A1* | 5/2015 | He | ....................... | G06Q 20/321 |
| | | | | 705/44 |
| 2019/0095926 A1* | 3/2019 | Li | ...................... | G06Q 20/3825 |

OTHER PUBLICATIONS

• Tomlinson et al. Body-Guided Galvanic Coupling Communication for Secure Biometric Data, IEEE Transactions on Wireless Communications, vol. 18, No. 8, Aug. 2019, pp. 4143-4156 (Year: 2019).*
• Tomlinson et al., "Secure On-skin Biometric Signal Transmission using Galvanic Coupling", IEEE Infocom 2019—IEEE Conference on Computer Communications; Apr. 29-May 2, 2019, pp. 1135-1143 (Year: 2019).*
International Search Report and Written Opinion for International Patent Application No. PCT/US2020/041373 dated Sep. 25, 2020, 12 pages.

* cited by examiner

BODY AREA NETWORK FACILITATED AUTHENTICATION OR PAYMENT AUTHORIZATION

CROSS-REFERENCE TO RELATED APPLICATIONS

This application is a continuation of U.S. patent application Ser. No. 16/514,978, entitled "BODY AREA NETWORK FACILITATED AUTHENTICATION OR PAYMENT AUTHORIZATION" filed on Jul. 17, 2019. The contents of the aforementioned application are incorporated herein by reference in their entirety.

BACKGROUND

Wireless communication devices are becoming the prevalent devices for performing transactions and identifying a user. The ease with which a portable device or mobile device can establish a wireless connection while in a user's pants pocket, jacket pocket, or purse enables a user to enter buildings, perform transactions and authenticate themselves to systems without having to actually contact an interface.

However, the increased use of wireless communication devices, also draws the attention of less scrupulous persons who develop their own wireless devices to intercept the wireless communications to either steal identifying information or, perhaps, decrypt the signals for use to generate false signals that may be used to manipulate a wireless transaction system.

A supposed advantage of some wireless communication systems, like near-field communication (NFC), is their relatively short range, such as 5 centimeters. However, there have been descriptions of devices capable of intercepting the exchange of NFC signals from as far away as 60 centimeters. In addition, devices that utilize NFC communication require a user to take out an NFC-equipped payment card or NFC-equipped mobile device to complete the transaction or authentication. Touchpads also have difficulty because they often require a resistance or capacitance reading.

To combat eavesdropping hardware and software developers have resorted to different forms of biometrics, such as fingerprint detection, facial recognition or voice recognition. The use of biometrics, in particular, fingerprint technology effectively eliminates any chance of a surreptitious interception of an authentication signal because the fingerprint is used as the authentication means and also eliminates the need for a user to remove a device from their pocket or purse. However, even fingerprint readers may be exploited by thieves, for example, there are devices configured to overlay on a fingerprint scanner and copy of the user's fingerprint for later use by the thieves.

Transaction and authentication system developers continually innovate to maintain an advantage over those who aim to steal money and information. However, the less scrupulous persons also continue to innovate for ways to thwart the increased security devices and procedures. There is a need for a more secure system for completing transactions and authenticating identities.

SUMMARY

Disclosed is an example of a method including a step of determining, based on receipt of a control signal, that an authentication signal is required to authorize a transaction. In response to the determination that the authentication signal is required, a wearable device may generate a modulated signal using an encryption or digital signing algorithm. The modulated signal may contain authentication information related to the wearable device including a cryptographic token related to the encryption or digital signing algorithm. The modulated signal is output to a biological medium interface of the wearable device. The biological medium interface is coupled to a biological medium of a wearer of the wearable device, and the biological medium is operable to conduct the modulated signal. A receiving device receives the modulated signal. The modulated signal is demodulated. Using the demodulated signal, the authentication information including the cryptographic token related to the wearable device is obtained. Based on the obtained authentication information, the transaction is authorized. An indication that the transaction has been authorized is provided.

Also disclosed is an example of a wearable device. The wearable device may include a logic circuit, a memory, a modulated signal generator, and a biological medium interface. The logic circuit includes an input interface and is operable to perform functions. The memory is operable to store authentication information. The logic circuit, the memory, and the modulated signal generator are coupled to one another. The biological medium interface is coupled to the modulated signal generator. Functions the logic circuit is operable to perform, include functions to, in response to an input received via the input interface, generate an authentication control signal. The logic circuit is also operable to forward the authentication control signal to the modulated signal generator. The modulated signal generator is operable to generate an authentication signal in response to the authentication control signal received from the logic circuit. The authentication signal is a modulated signal containing an encrypted message. The authentication signal is output from the biological medium interface to a biological medium of a wearer of the wearable device. The biological medium interface of the wearable device is substantially in physical contact with the biological medium of the wearer.

A system is disclosed including a wearable device and a signal detector. The wearable device includes a logic circuit, a wearable device communication interface, a memory, a modulated signal generator, and a biological medium interface. The logic circuit, the memory, the wearable device communication interface, modulated signal generator, and the biological medium interface are communicatively coupled to one another. The signal detector includes a processor, a signal detector communication interface, and an input device operable to detect signals. The modulated signal generator is operable to generate an authentication signal in response to a control signal received via the wearable device communication interface. The authentication signal is a modulated signal containing an encrypted message including a cryptographic token. The modulated signal generator outputs the authentication signal from the biological medium interface to a biological medium of a wearer of the wearable device. The biological medium of the wearer is in physical contact with the biological medium interface of the wearable device. The signal detector is operable to receive at the input device the authentication signal emitted via the biological medium of the wearer. The signal detector may demodulate the authentication signal to extract the encrypted message. The encrypted message may be forwarded, via the signal detector communication interface, for processing to authenticate that the wearable device is associated with an authorized user of a payment card account.

DETAILED DESCRIPTION

The various examples disclose a system, devices, and techniques that utilize a wearer's body to conduct authentication signals to a signal detector. Since the authentication signals are conducted through the body, any eavesdropping of the authentication signal and the respective content is mitigated. Disclosed are examples that transmit an authentication signal that are radio-frequency signals, or sonic or ultrasonic signals embedded in the skin and/or tissue including bone, which are in general referred to as "a biological medium." The authentication signal, whether radio-frequency, sonic or ultrasonic, may be received by a signal detector, which may amplify and process the received signal.

The authentication signal may be encrypted according to examples described herein as well as examples of the encryption key generation techniques described in U.S. patent application Ser. No. 16/205,119, filed Nov. 29, 2018, the entire contents of which is incorporated by reference herein in its entirety.

The examples described herein include wireless methods of providing authentication information having an increased security factor of being transmitted via a biological medium that minimizes the possibility of surreptitious eavesdropping of the authentication signal. It may be helpful to describe a system implementation.

Figure 1:
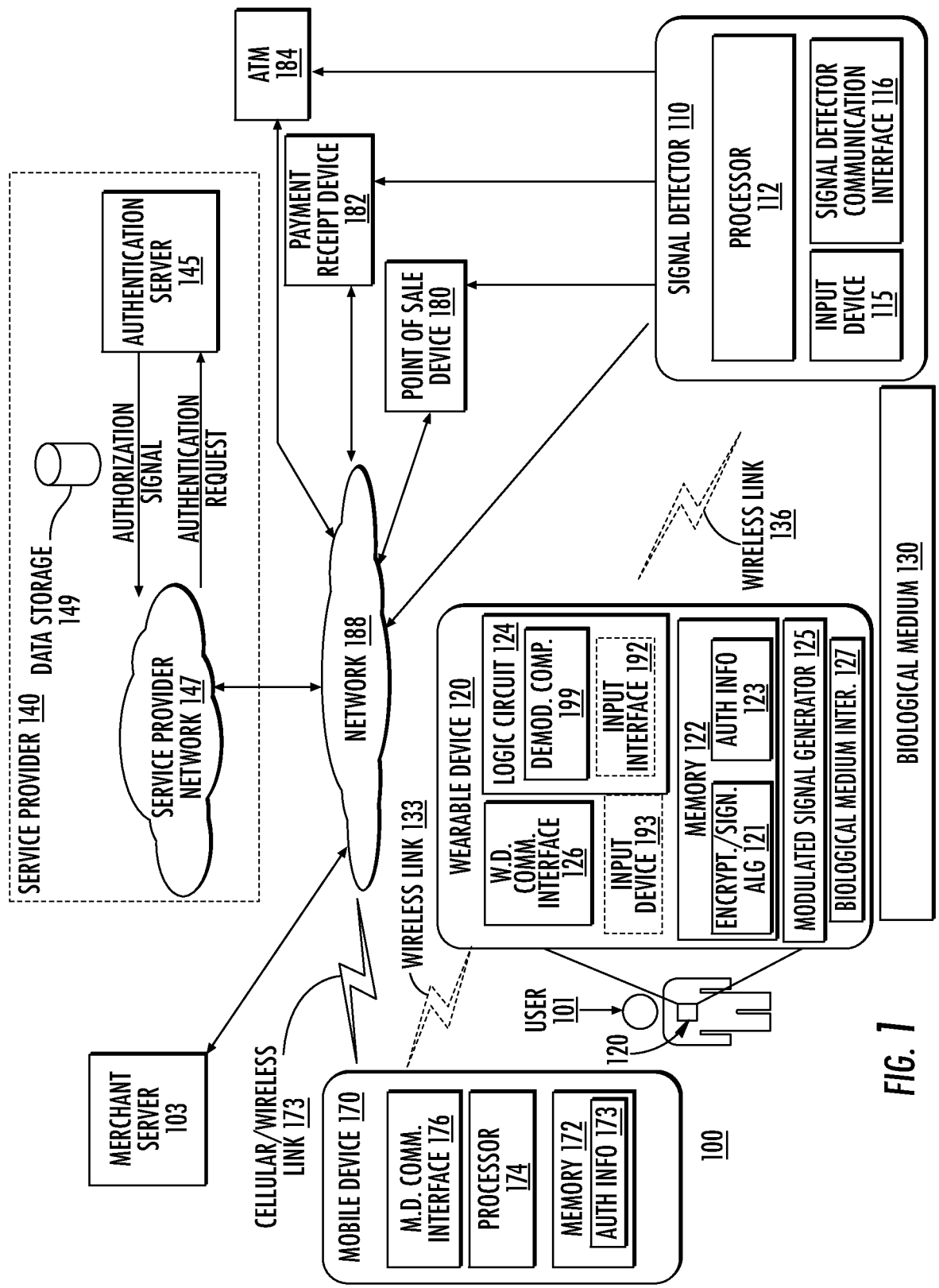
FIG. 1 illustrates an example of an implementation of a system for utilizing a body area network for wireless authentication and payment authorizations as described herein.

FIG. 1 illustrates an example of a system operable to execute an authentication operation or purchase transaction using a biological medium for signal transmission.

The system 100 may include a number of components. In the FIG. 1 example, the system 100 includes a signal detector 110, a wearable device 120, and a biological medium 130. In addition, the system 100 may, in more detailed examples, include a service provider 140, a network 188, a merchant server 103, and a mobile device 170. A user 101 may be wearing or carrying the wearable device 120. The user 101 may be a user associated with a payment account which is also associated with the wearable device 120. The service provider 140 includes a service provider network 147, an authentication server 145 and data storage 149.

The user 101 may also have a mobile device 170 that is communicatively coupled with the network 188 via a cellular/wireless link 133 and the wearable device 120. The mobile device 170 may include a mobile device communication interface 176, a processor 174, a memory 172 and other components (shown in other examples). The mobile device memory 172 may securely store authentication information 173. The mobile device communication interface 176 may be coupled to one or more transmitters, receivers or transceivers, such as a cellular transceiver, one or more wireless transceivers, such as Bluetooth™, Wi-Fi, near-field communication (NFC), or the like. The mobile device 170 may communicate with the wearable device 120 via wireless communication link 133, which may be a link using one of: Bluetooth, Wi-Fi, NFC, or the like. For example, the mobile device 170 may receive via the mobile device communication interface 176 a message indicating authentication information is required from a point of sale device 180. In response, the mobile device 170 may issue a control signal to the wearable device via the wireless communication link 133 instructing the wearable device to output an authentication signal. Additional details are described below.

In the example of FIG. 1, the wearable device 120 includes a logic circuit 124, a wearable device communication interface 126, a memory 122, a modulated signal generator 125, and a biological medium interface 127. The logic circuit 124, the memory 122, the wearable device communication interface 126, modulated signal generator 125, and the biological medium interface 127 are communicatively coupled. The wearable device 120 may be, for example, a ring, eyeglasses, a necklace, a wristwatch or the like. The logic circuit 124 may include a demodulation component 199 that is operable to demodulate a modulated signal (described in more detail below) output from a biological member. In an example, the wearable device 120 may include an input interface 192 that is operable to receive inputs from a user 101 (or wearer) of the wearable device 120.

The signal detector 110 may, for example, include a processor 112, a signal detector communication interface 116, and an input device 115 operable to detect signals. In an example, the signal detector 110 may be coupled to a point of sale device 180, a payment receipt device 182 (such as a portable payment device with a touchpad and card reader or the like), an automatic teller machine (ATM) 184, or the like.

The input device 115 may detect either sonic, ultrasonic or radio frequency signals, and may be operable to detect an electrical signal, a sonic signal or an ultrasonic signal. For example, the input device 115 may include a piezo-electric transducer, a micro-electro-mechanical microphone, a radio-frequency antenna, an ultrasonic transducer, or the like and related circuitry, such as an amplifier or the like.

The network 188 may be operable to exchange data and enable communications to be exchanged between the various components of the system 100. For example, the network 188 may include at least one of: a cellular network, a data network, or an enterprise network. In an example, the network 188 may a combination of a cellular network and a data network such as the internet. The network 188 may be communicatively coupled to the signal detector communication interface 116 of the signal detector 110 and also to the mobile device 170 as well as a merchant server 103. For example, purchase transactions between the wearable device 120, via the signal detector 110 and either the point of sale device 180 or the payment receipt device 182, and the merchant server 103 may be authenticated via network 188.

The authentication server 145 may also be coupled to the signal detector 110 via the network 188. The authentication server 145 is operable to perform a various functions. With respect to the present example, the authentication server 145 may receive an encrypted message sent by the signal detector 110 via the data network. The authentication server 145 may process the received encrypted message to extract authentication information related to an authorized user 101 of a payment account associated with the wearable device 120. The authentication server may for example, analyze the extracted authentication information to determine the validity of the authentication information. For example, the authentication server 145 may access a data storage 149 coupled to the authentication server 145 to obtain information related the authorized user of a payment account associated with the wearable device 120. The authentication information may be processed, for example, decrypted or some other process, by the authentication server and the decrypted authentication information may be compared to the obtained information to confirm the validity of the information. The authentication server 145 may confirm, using the authentication information, that the wearable device 120 is associated with an authorized user 101 of a payment card account. In response to a confirmation that the wearable device is associated with an authorized user 101 of a payment card account, the authentication server 145 may send, via the network 188, an authorization signal authorizing completion of a transaction to a point of sale device 180, a payment receipt device 182 (which may be a mobile or portable payment receipt device), or an automatic teller machine 184. In the following examples, the authentication signal is a modulated radio frequency signal or a modulated ultrasonic signal.

In an example, the signal detector 110 may be coupled to the point of sale (POS) device 180, the payment receipt device 182 or the ATM 184. For example, the signal detector 110 may be a stand-alone device located in proximity to the POS device 180. Whenever any user interacting with one of the point of sale device 180, the payment receipt device 182 or the ATM 184, the respective device may emit a control signal, which may be transmitted via the signal detector communication interface 116 over a wireless link 136. For example, the signal detector communication interface may include an NFC, Bluetooth, Wi-Fi, short range LTE transmitter or the like.

The modulated signal generator 125 is operable to generate an authentication signal which is a modulated signal generated using an encryption algorithm 121. The authentication signal, for example, may contain authentication information 123 related to the wearable device including, for example, a cryptographic token related to the encryption or a digital signing algorithm 121. The authentication information may, for example, further include at least one of: a payment card identifier, an account identifier, an issuer identifier, a cryptographic token, or biometric data. For example, a cryptographic token may be included in the encrypted message (whether transaction, or authentication only message) and may be generated using any authentication protocol. Examples of a cryptographic token include digital signatures of the transaction message, encryptions of the authentication information, as well as two-way protocols where the wearable device 120 could sign a challenge from the service (e.g., a purchase point of sale device, an ATM or the like) being authenticated.

In another example, a digital signing algorithm, such as 121, may be an algorithm that enables authentication of the wearer of the wearable device as an authorized user of a payment account while the wearer uses their finger to "sign" a touchpad, touchscreen, fingerprint reader, or the like to authorize a purchase or complete a transaction.

The authentication signal may include an encrypted message based on, or including part of, the authentication information. The encrypted message may, for example, include information usable to authenticate that the wearable device 120 is associated with a payment account of a user. In another example, the encrypted message may include at least one of: an encrypted payment card identifier, an encrypted account identifier, an encrypted issuer identifier, or encrypted biometric data. The authentication signal may be output from the biological medium interface 127 to a biological medium 130 of a wearer of the wearable device 120. The biological medium interface 127 of the wearable device may be substantially in physical contact with the biological medium 130 of the wearer. In an example, "substantially in physical contact" may be within a range of 0.0-0.5 millimeters, 1-3 millimeters, 1-5 centimeters, or the like.

The signal detector 110 may be operable to receive at the input device 115 the authentication signal emitted via the biological medium 130 of the wearer (e.g. user 101). The signal detector 110 via the processor 112 may demodulate the authentication signal to extract the encrypted message. The signal detector 110 in response to extracting the message, may forward, via the signal detector communication interface 116, the encrypted message for processing to authenticate that the wearable device is associated with an authorized user (e.g., user 101) of a payment card account.

In a further example, the logic circuit 124 may an input interface 192. The input interface 192 may receive inputs from an input device 193. In response to the received inputs, the logic circuit 124 may retrieve the authentication information 123 stored in the memory 122. The authentication information 123 stored in the memory 122 may include at least one of: a cryptographic token, a payment card number, an account number, an issuer identifier, or biometric data. The logic circuit 124 may use the authentication information 123 in the generation of an authentication control signal. In an example, the authentication control signal may include a cryptographic authentication message that may contain at least the cryptographic token. The cryptographic authentication message may include other authentication information either in addition to, or in place of, the cryptographic token. In an example, the authentication control signal may be provided to the modulated signal generator 125 for use in generating a modulated signal for output.

Figure 2A:
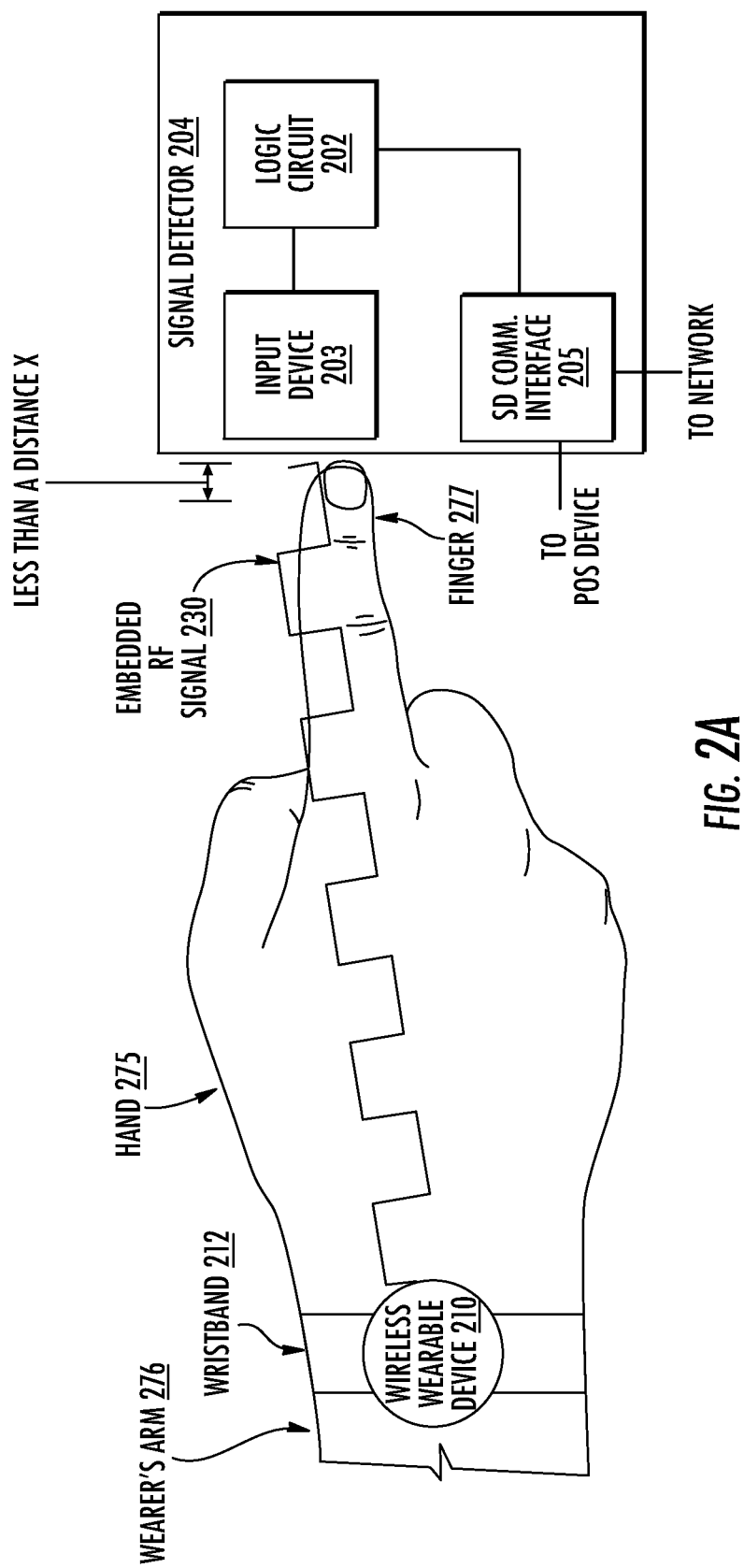
FIG. 2A illustrates an example of a wearable device usable in the wireless authentication and payment authorizations system disclosed in FIG. 1.

FIG. 2A illustrates an implementation of elements of the system 100 shown in FIG. 1. In the example of FIG. 2A, a wireless wearable device 210 is secured to a wearer's arm 276 by a wristband 212. The wireless wearable device 210 is operable to transmit a radio frequency signal via a wearer's hand 275. The wireless transmit wearable device 210 may be configured similar to the wearable device 120 of FIG. 1 to embed a radio frequency signal, such as embedded RF signal 230, via the wearer's hand 275. The embedded RF signal 230 is received by the signal detector 204. The signal detector 204 may include an input device 203, logic circuit 202 and a signal detector (SD) communication interface 205. The input device 203 may, for example, have an antenna tuned to a frequency of the embedded RF signal 230 emitted from the finger 277. The finger 277 may be touching the input device 203 or be at least within a distance less than distance X, where X is, for example, 1.3 centimeters, 1.0 centimeter, 5 millimeters or the like. The input device 203 may receive the embedded RF signal 230. The embedded RF signal 230 may be a modulated signal, which is described in more detail with reference to FIG. 2B below.

The input device 203 may deliver an amplified modulated signal to the logic circuit 202. The logic circuit 202 may demodulate the modulated signal and extract the authentication information embedded in the embedded RF signal 230. The extracted authentication information may be forwarded to the signal detector (SD) communication interface 205. The SD communication interface 205 may forward the signal to either a POS device, such as 180 of FIG. 1, to complete a purchase or to a network, such as 188, for authentication.

Figure 2B:
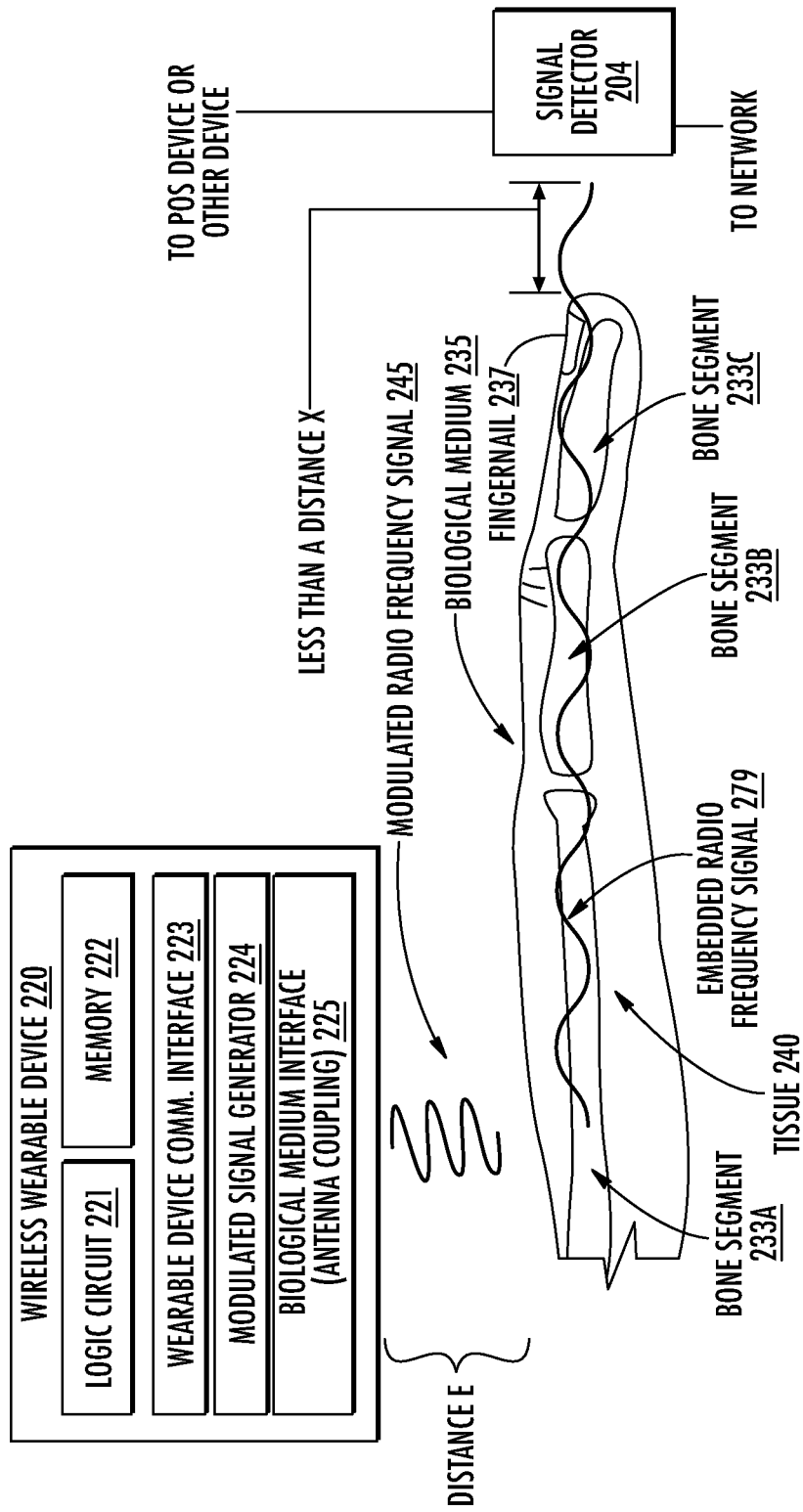
FIG. 2B illustrates a more detailed example of a wearable device usable in the wireless authentication and payment authorizations system examples disclosed in the FIGS. 1 and 2A.

It may be helpful to describe the wireless wearable device 210 of FIG. 2A with reference to a biological medium, such as finger. FIG. 2B illustrates an example of system that includes a wireless wearable device, a modulated signal detector and a biological medium. In the example, the wireless wearable device 220 includes a logic circuit 221, a memory 222, a modulated signal generator 224 and a biological medium interface referred to in this example as an antenna coupling 225. The biological medium 235 may include bone segment 233A, bone segment 233B, bone segment 233C, tissue 240 and fingernail 237. The signal detector 204 is the same as the signal detector of FIG. 2A; therefore, no additional details related to the structure or function of the signal detector are provided.

The modulated signal generator 224 may also function similar to the modulated signal generator 125 discussed with reference to FIG. 1. However, the modulated signal generator 224 is operable to output a modulated radio frequency signal via the antenna coupling 225 onto (or into) the biological medium 235. The biological medium 235 may be any body part of a wearer of the wireless wearable device 220. For example, a wearer (such as user 101 of FIG. 1) may wear the wireless wearable device 220 on a shoulder strap, an armband, a fanny pack, a finger (as in a ring), wrist as in FIG. 2A, or the like.

The carrier signal upon which is modulated with the authentication information including the cryptographic token or with an encrypted or digitally signed message may be any frequency that enables transmission via the biological medium. For example, since the biological medium is substantially made up of water, low radio frequency carrier signals in the example propagate through the biological medium with less loss. Alternatively, higher frequency carrier signals may be used but with more power than the lower frequency signals and for short durations. Examples of radio frequencies that may be used include 1 kHz, 10, kHz, 100 kHz, a range such as 23 kHz-1 GHz, 2.4 GHz or the like.

The modulation scheme used to generate the embedded RF signal may be an amplitude shifting keying (ASK), a frequency-shift keying (FSK), phase shift keying (PSK), complimentary code keying (CCK), a pulse code modulation (PCM), techniques that include amplitude shifting across multiple frequencies, or the like. Alternatively, particular phase-shift modulation schemes such as differential PSK (DPSK) or coherent PSK (CPSK), or more specifically, Binary PSK (BPSK), Quaternary PSK (QPSK), 8PSK, 16PSK, Offset Quaternary PSK (OQPSK), SOQPSK (Shaped OQPSK) may be used. Of course, the various modulation schemes may be combined to provide a custom modulation scheme more suited for signal transmission through the biological medium, such as 235 of FIGS. 2B and 2C.

For example, the data rate for providing the authentication signal may be low, such as, for example, less than 1 kilobit per second. To provide this data rate, it may be beneficial to utilize a hybrid modulation scheme that combines a temporal modulation scheme, such as a pulse width modulation (PWM) scheme, or the like, with one of the above referenced phase-shift modulation or frequency-modulation schemes. In an example, the combined (temporal with PSK) modulation scheme may be utilized to provide accurate data transmission, acceptable signal loss as the signal passes through the biological medium, and an acceptable data rate. Alternatively, a combined modulation scheme may include a temporal modulation scheme with one of the other modulation schemes ASK, FSK, CCK, PCM or the like.

In addition, one or more short-range wireless communication protocols and frequencies such as near-field communication (NFC), the EMV standard, Bluetooth or the like, and in conformance with ISO/IEC 14443, may be used in the transmission of the modulated signal.

Upon generation of the modulated signal containing the authentication information, the modulated signal generator 224 may forward the modulated signal to the antenna coupling 225 for output to the biological medium 235. The antenna coupling 225 may, for example, be an antenna that has a conductive pad (not shown) configured for maximum power transfer of power with respect to the frequency of the modulated signal. The antenna coupling 225 may be within a distance E of the biological medium 235. The distance E may be less than 1.0 centimeter, for example, 0.5 centimeters, 0.0 centimeters (i.e., essentially touching the biological medium 235) or the like. Alternatively, the distance E may be a range of distances, such as 0.3-0.5 centimeters, 0.0-2.0 millimeters, or the like.

The antenna coupling 225 may output the modulated radio frequency signal 245 which is input to the biological medium 235. The modulated radio frequency signal 245 is transmitted through the bone segments 233A, 233B, 233C, fingernail 237 and tissue 240 including connective tissue. The embedded radio frequency signal 279 is output from the biological medium for detection by the signal detector 204. As discussed with reference to other examples, the signal detector 204 may receive and process the embedded radio frequency signal 279 to obtain the authentication information. The signal detector 204 may forward the authentication information to a point of sale or another device (or to the network).

Figure 2C:
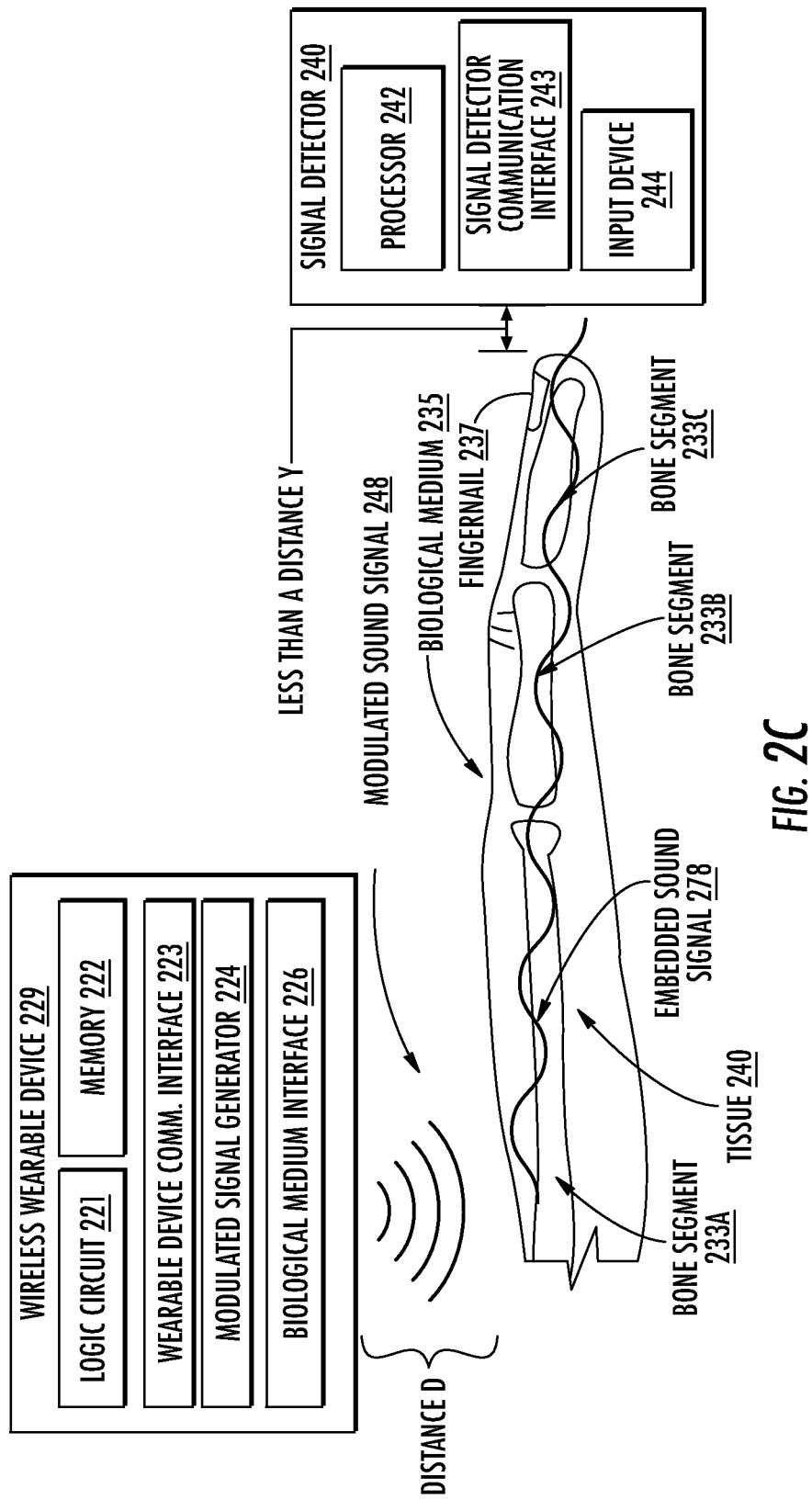
FIG. 2C illustrates another example of a wearable device usable in the wireless authentication and payment authorizations system disclosed in FIG. 1.

The system 100 of FIG. 1 may also included other examples of a modulated signal. FIG. 2C illustrates an example in which the modulated signal is a sonic or ultrasonic signal. In the example of FIG. 2C, the wireless wearable device 229 may include elements like those in the wireless wearable device 220 of FIG. 2B, such as the logic circuit 221, the memory 222, the wearable device communication interface 223, the modulated signal generator 224. The biological medium 235 is the same in both examples shown in FIGS. 2B and 2C. In the case of sonic or ultrasonic signals, the above-mentioned modulation schemes may also be utilized but the output from the wireless wearable device 229, in this example, is a modulated sound signal (e.g., sonic or ultrasonic). For example, sound waves above 20 kHz are above, or nearly above, the range of typical human hearing and are considered "ultrasonic." Ultrasound exams are performed at frequencies from 10 MHz and above. Sonic sound waves may be considered those below 20 kHz, but that may still be difficult for humans to hear. For example, the modulated sound signal 248 may be a beeping sound or the like that is not offensive to humans or animals.

Like the wireless wearable device 229, the biological medium interface 226 may include be a transducer that generates modulated sound waves in response the modulated signal output by the modulated signal generator 224. The distance between the biological medium interface 226 and the biological medium 235 may be a distance D. The distance D may be in the range of approximately 0.0-5.0 millimeters, approximately 0.0-5.0 centimeters, or the like. The biological medium interface 226 may output the modulated sound signal 248 for embedding on or into the biological medium 235. The embedded sound signal 278 may propagate through the bone segments 233A-C, tissue 240 including connective tissue, and fingernail 237 for output to the signal detector 204. The signal detector 204 may include a processor 242, a signal detector communication interface 243, and an input device 244. The input device 244 may be a micro-electro-mechanical device, a piezo-electric device, or a similar device that outputs an electrical signal in response to detected sound. The distance between the biological medium 235 and the signal detector 204 for detection of the embedded sound signal by the input device 244 may be a distance less than the distance Y. The distance Y may be, for example, approximately 1.0 centimeter, 5.0 millimeters, 2 centimeters or the like.

The signal detector 204 may be similar to the signal detector 110 of FIG. 1. In the example of FIG. 2C, the processor 242 may be operable to receive the electrical signals output from the input device 244 and process them to perform an authentication process or assist in the completion of a purchase transaction.

Figure 3:
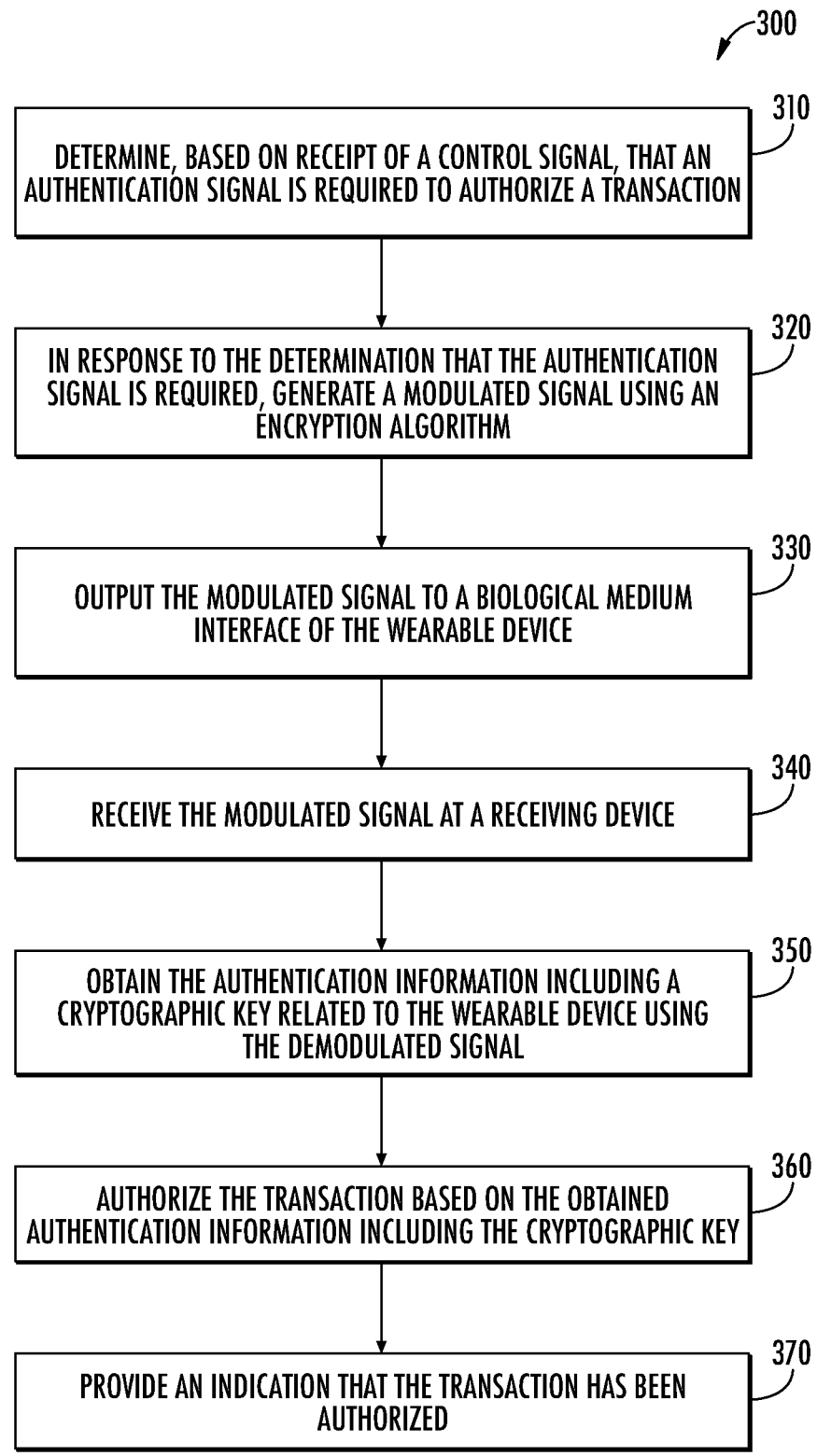
FIG. 3 presents a flow chart for a process example of authenticating and authorizing transactions implementable in the system example of FIG. 1 and the wearable device examples of FIGS. 2A and 2B.

It may be beneficial to discuss an example of a process performed by the foregoing system and a device examples to better understand the advantages of the disclosed examples. The described process may be implemented on a non-transitory computer readable medium or the like. FIG. 3 illustrates an example of a process for authenticating a user or assisting in the completion of a purchase request. In the process 300 of FIG. 3, devices such as those described in the examples of FIGS. 1-2C may be used. For example, based on receipt of a control signal, a wearable device may determine that an authentication signal is required to authorize a transaction, for example, by verifying or authenticating a user (310). In response to the determination that the authentication signal is required, a wearable device may generate a modulated signal using an encryption algorithm (320). For example, prior to generating the modulated signal by the wearable device, a menu of one or more authentication options may be presenting on a display device, provided by the wearable device communication interface, of the wearable device. The wearable device may receive an input, such as a touch, gesture, motion or voice input, to the wearable device and cause the presentation of one or more authentication options on the display device of the wearable device. An authentication option may be selected via another input to the wearable device. The authentication information associated with the selected authentication option may be retrieved from a memory of the wearable device. In the example, the selected authentication option utilizes a cryptographic token.

In another example, the modulated signal may contain authentication information related to the wearable device including a cryptographic token related to the encryption or digital signing algorithm. At 330, a modulation signal generator, such as 125 of FIG. 1, may output the modulated signal to a biological medium interface, such as 127 of FIG. 1, of the wearable device, such as 120 of FIG. 1. In the example, the biological medium interface may be coupled to a biological medium (e.g., finger, shoulder, arm, leg, jaw, head or the like) of a wearer of the wearable device. As discussed, the biological medium is operable to conduct the modulated signal, for example as an embedded modulated signal. A received device, such as signal detector 110 including input device 115, or the like, may receive the modulated signal (340). As discussed with respect to the examples of FIGS. 1-2C, a processor within the signal detector, such as 112 of FIG. 1, may be operable to demodulate the modulated signal. Using the demodulated signal, the processor of the signal detector may be further operable to obtain (350), via a signal detector communication interface, such as 116, the authentication information related to the wearable device. The authentication information, which may include a cryptographic token, may be sent to an authentication server, such as 145 of FIG. 1 via the network 188. Based on the obtained authentication information, the transaction may be authorized (360). In the example, the authorizing of the transaction may further include authenticating a wearable device as being associated with a payment card presented for completion of a purchase transaction. Alternatively, the wireless wearable device may be authenticated as being associated with a payment account. In response to the authorization or authentication, an indication may be provided indicating that the transaction has been authorized, the user has been authenticated, or both (370). For example, the indication may be an authorization signal sent, via the data network (e.g., the Internet), in response to a confirmation that the wearable device is associated with an authorized user of a payment card account. Depending upon the usage example, the authorization signal may be sent to a point of sale device, a mobile payment receipt device, or an automatic teller machine authorizing completion of a transaction. In the examples, the point of sale device, the mobile payment receipt device, or the automatic teller machine is coupled to the signal detector.

In an example, the indication that the transaction has been authorized may be presented on a display device coupled to at least one of a mobile device, the receiving device (e.g., signal detector 110), or the wearable device. For example, the indication may be provided to one or more of: a point of sale device, a payment receipt device, an ATM, a mobile device associated with the wireless wearable device, a merchant server, or the like.

As mentioned in the examples of FIGS. 2A and 2B, the modulated signal may be a modulated radio frequency signal. In this specific example, the process 300 and receiving the modulated signal, via the biological medium at the receiving device at 340, may include specific steps of detecting the modulated radio frequency signal when emitted from the biological medium of the wearer of the wearable device. The detected modulated radio frequency signal to a demodulation component, such as 199 in FIG. 1, within the logic circuits 202 or 221.

In addition, in the example of FIGS. 2A and 2B, the signal detector when the receiving, via the biological medium at the receiving device, may further include detecting by an antenna (within input device 203) in the receiving device (e.g., signal detector 204) the modulated radio frequency signal upon emission from the biological medium of the wearer of the wearable device. The detected modulated radio frequency signal may be provided to a signal processing component.

In another example of process 300, the modulated signal may be a modulated ultrasonic signal as in the example of FIG. 2C. When the modulated signal is a modulated ultrasonic signal, the step of receiving, via the biological medium at the receiving device may include additional details. For example, in response to the modulated ultrasonic signal, a modulated electrical signal may be generated by a transducer of the receiving device. For example, the transducer may be an input device, such as 244 described above with reference to FIG. 2C. The modulated electrical signal may be provided to a demodulation component, such as within the processor 242.

Figure 4:
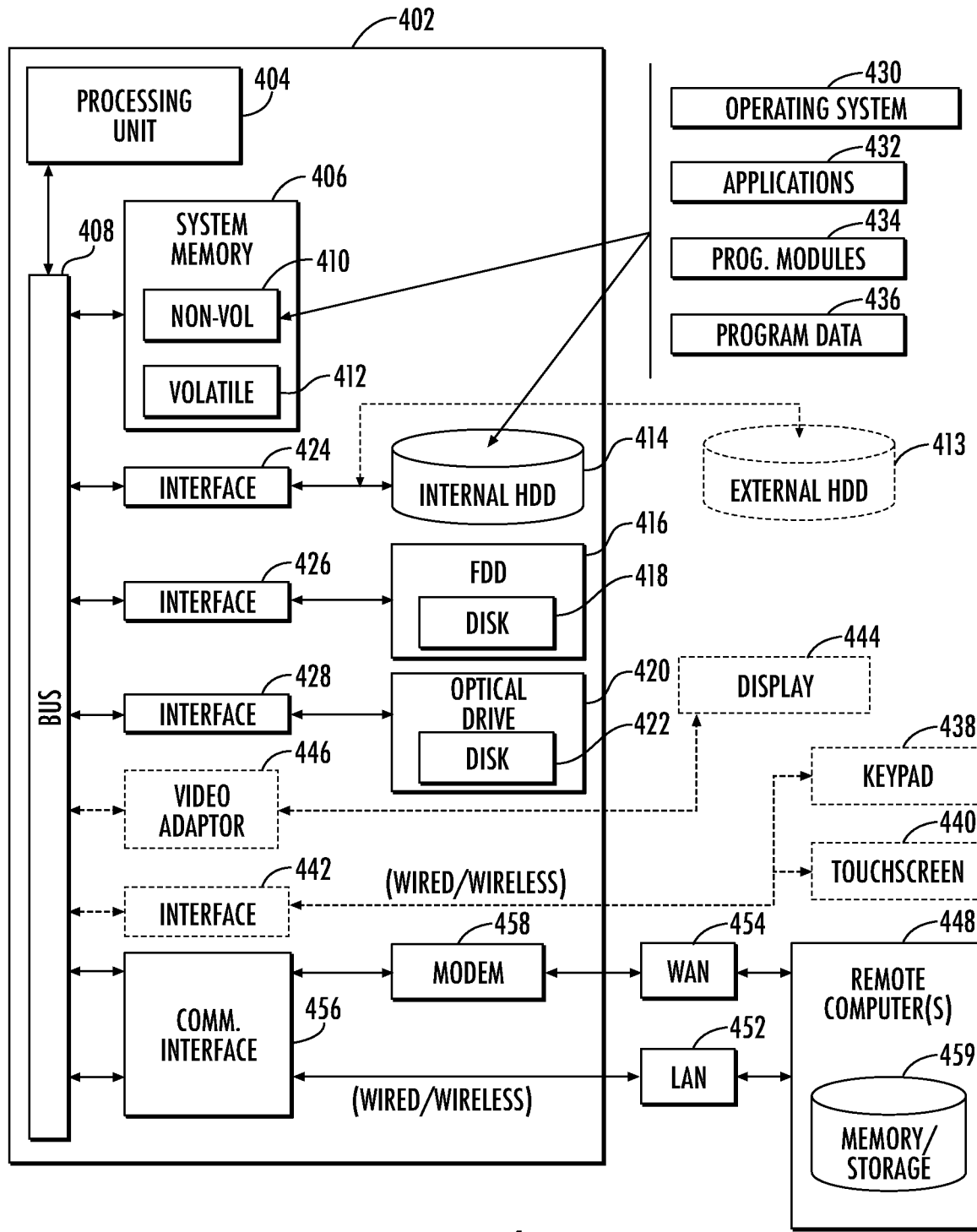
FIG. 4 illustrates an example of a computing architecture suitable for implementing the examples illustrated in FIGS. 1-3.

FIG. 4 illustrates an example of an exemplary computing architecture 400 suitable for implementing various examples as previously described. In one example, the computing architecture 400 may be incorporate elements as may be typically used to implement a server or network platform, if appropriately programmed, as part of system 100. In another example, the computing architecture 400 may be incorporate optional elements that may be typically used to implement a smart digital device or a computing device that may be implemented as part of system 100.

The computing architecture 400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 400.

As shown in FIG. 4, the computing architecture 400 includes a processing unit 404, a system memory 406 and a system bus 408. The processing unit 404 can be any of various commercially available processors or number of processors.

The system bus 408 provides an interface for system components including, but not limited to, the system memory 406 to the processing unit 404. The system bus 408 can be any of several types of bus structures that may further interconnect to a memory bus (with or without a memory controller), a peripheral bus, and a local bus using any of a variety of commercially available bus architectures. Interface adapters may connect to the system bus 408 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 400 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Examples may also be at least partly implemented as instructions contained in or on a non-transitory computer-readable medium, which may be read and executed by one or more processors to enable performance of the operations described herein.

The system memory 406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 4, the system memory 406 can include non-volatile memory 410 and/or volatile memory 412. A basic input/output system (BIOS) can be stored in the non-volatile memory 410.

The computer 402 may include various types of computer-readable storage media in the form of one or more lower speed memory units, including an internal hard disk drive (HDD) 414 (or, optionally, external hard disk drive (HDD) 413), a magnetic floppy disk drive (FDD) 416 to read from or write to a removable magnetic disk 418, and an optical disk drive 420 to read from or write to a removable optical disk 422 (e.g., a CD-ROM or DVD). The HDD 414 or 413, FDD 416 and optical disk drive 420 can be connected to the system bus 408 by an HDD interface 424, an FDD interface 426 and an optical drive interface 428, respectively. The HDD interface 424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of computer program modules can be stored in the drives and memory 410, 412, including an operating system 430, one or more application programs 432, other program modules 434, and program data 436. In one example, the one or more application programs 432, other program modules 434, and program data 436 can include, for example, the various applications and/or components of the computing architecture 400. At least one computer-readable storage medium may include instructions that, when executed, cause a system to perform any of the computer-implemented methods and processes described herein.

Optionally, when configured as a mobile device or the like, the computing architecture 400 may include additional devices to enable data input and output to a user. For example, a user may enter commands and information into the computer 402 through one or more wire/wireless optional input devices, for example, a keypad 438 and a tactile input device, such as a touchscreen 440. Other input devices may include microphones, infra-red (IR) remote controls, radio-frequency (RF) remote controls, game pads, stylus pens, near-field communication devices, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 404 through optional interface 442 that is coupled to the system bus 408 but can be connected by other interfaces such as a parallel port, IEEE 1394 serial port, a game port, a USB port, an IR interface, and so forth.

Another optionally element may be display 444, which may be an organic light emitting diode (OLED), light emitting display (LED), or other type of display device, that is also connected to the system bus 408 via an interface, such as an optional video interface 446. The display 444 may be internal or external to the computer 402. In addition to the display 444, a computer typically includes other peripheral output devices, such as speakers, printers, and so forth which may be coupled to the system bus 408 via the optional interface 442.

The computer 402 may operate in a networked environment using logical connections via wire and/or wireless communications to one or more remote computers, such as a remote computer 448. The remote computer 448 can be a workstation, a server computer, a router, a personal computer, portable computer, microprocessor-based entertainment appliance, a peer device or other common network node, and typically includes many or all the elements described relative to the computer 402, although, for purposes of brevity, only a remote memory/storage device 459 is illustrated. The logical connections depicted include wire/wireless connectivity to a local area network (LAN) 452 and/or larger networks, for example, a wide area network (WAN) 454. Such LAN and WAN networking environments are commonplace in offices and companies, and facilitate enterprise-wide computer networks, such as intranets, all of which may connect to a global communications network, for example, the Internet.

When used in a LAN networking environment, the computer 402 may be connected to the LAN 452 through a wire and/or wireless communication network interface or interface 456. The interface 456 can facilitate wire and/or wireless communications to the LAN 452, which may also include a wireless access point disposed thereon for communicating with the wireless functionality of the interface 456.

When used in a WAN networking environment, the computer 402 can include a modem 458, or is connected to a communications server on the WAN 454 or has other means for establishing communications over the WAN 454, such as by way of the Internet. The modem 458, which can be internal or external and a wire and/or wireless device, connects to the system bus 408 via the interface 442. In a networked environment, program modules depicted relative to the computer 402, or portions thereof, can be stored in the remote memory/storage device 459. It will be appreciated that the network connections shown are exemplary and other means of establishing a communications link between the computers can be used.

The computer 402 is operable to communicate with wired and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, near-field communication (NFC), among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions). The wireless technologies may couple to the computer 402 via one or more transceivers (not shown) within for example the interface 442 or communication interface 456 that facilitate the use of the Wi-Fi, WiMax, NFC, Bluetooth wireless technologies as well as others.

The various elements of the devices as previously described with reference to FIGS. 1-4 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

As used in this application, the terms "system" and "component" are intended to refer to a computer-related entity, either hardware, a combination of hardware and software, software, or software in execution, examples of which are provided by the exemplary computing architecture 400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in examples.

Some examples may be described using the expression "one example" or "an example" along with their derivatives. These terms mean that a particular feature, structure, or characteristic described in connection with the example is included in at least one example. The appearances of the phrase "in an example" in various places in the specification are not necessarily all referring to the same example. Moreover, unless otherwise noted the features described above are recognized to be usable together in any combination.

Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more examples. Rather, the operations are machine operations.

Examples may be described using the expression "coupled" and "connected" along with their derivatives. These terms are not necessarily intended as synonyms for each other. For example, the terms "connected" and/or "coupled" may be used to indicate that two or more elements are in direct physical or electrical contact with each other. The term "coupled," however, may also mean that two or more elements are not in direct contact with each other, but yet still co-operate or interact with each other.

As used in this application, the terms "system" and "component" are intended to refer to a computer-related entity, either hardware, a combination of hardware and software, software, or software in execution, examples of which are provided by the examples in FIGS. 1-4. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or processor and the server or processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Various examples also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single example for streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. A wearable device, comprising:
an antenna;
a logic circuit including an input interface;
a memory operable to store authentication information;
a modulated signal generator operable to generate a modulated electrical signal, wherein the logic circuit, the memory, the antenna and the modulated signal generator are coupled to one another; and
wherein the logic circuit is operable to:
determine based on receipt of a control signal that an authentication signal is required to authorize a purchase transaction;
in response to the determination that the authentication signal is required, instruct the modulated signal generator to generate a modulated radio frequency signal using an encryption algorithm, wherein the modulated signal contains authentication information related to the wearable device including a cryptographic token related to the encryption algorithm;
output the modulated radio frequency signal to the antenna, wherein the antenna is coupled to a biological medium of a wearer of the wearable device and is not in physical contact with the biological medium of the wearer, and the biological medium is operable to conduct the modulated radio frequency signal; and
receive, by the wearable device, in response to the outputted modulated radio frequency signal, an indication that the purchase transaction has been authorized.

2. The wearable device of claim 1, wherein the logic circuit is further operable to perform:
   present the indication that the purchase transaction has been authorized on a display device coupled to the wearable device.

3. The wearable device of claim 1, further comprising:
   a display device coupled to the processor; and
   wherein the logic circuit is further operable to perform:
      prior to generating the modulated radio frequency signal by the wearable device, present a menu of one or more authentication options on the display device;
      receive an input selecting one or more authentication options on the display device;
      select an authentication option via another input; and
      retrieve authentication information associated with the selected authentication option from the memory, wherein the selected authentication option utilizes the cryptographic token.

4. The wearable device of claim 1, wherein:
   the authentication information further includes at least one of: a payment card identifier, a payment card number, an account number, an account identifier, an issuer identifier, or biometric data.

5. The wearable device of claim 1, wherein the modulated signal generator is operable to:
   generate an authentication signal in response to an authentication control signal received from the logic circuit, wherein the authentication signal is a modulated radio frequency signal containing an encrypted message including information usable to authenticate that the wearable device is associated with a payment account; and
   output the authentication signal from the antenna to a biological medium of a wearer of the wearable device to complete a purchase transaction.

6. The wearable device of claim 1, wherein the wearable device is a ring, eyeglasses, a necklace, or a wristwatch.

7. The wearable device of claim 1, wherein the logic circuit is operable to communicate with a mobile device.

8. A computer-implemented method for a wearable device system, comprising:
   determining, by a logic circuit, based on receipt of a control signal that an authentication signal is required to authorize a purchase transaction;
   in response to the determination that the authentication signal is required, instructing, by the logic circuit, a modulated signal generator generates a modulated radio frequency signal using an encryption algorithm, wherein the modulated signal contains authentication information related to a wearable device including a cryptographic token related to the encryption algorithm;
   outputting, by the logic circuit, the modulated radio frequency signal to an antenna, wherein the antenna is coupled to a biological medium of a wearer of the wearable device and is not in physical contact with the biological medium of the wearer, and the biological medium is operable to conduct the modulated radio frequency signal; and
   receiving, by the wearable device, in response to the outputted modulated radio frequency signal, an indication that the purchase transaction has been authorized.

9. The method of claim 8, comprising presenting the indication that the purchase transaction has been authorized on a display device coupled to the wearable device.

10. The method of claim 8, comprising:
    presenting, via a display device by the logic circuit, a menu of one or more authentication options on the display device;
    receiving, by the logic circuit, an input selecting one or more authentication options on the display device;
    selecting, by the logic circuit, an authentication option via another input; and
    retrieving, by the logic circuit, authentication information associated with the selected authentication option from memory, wherein the selected authentication option utilizes the cryptographic token.

11. The method of claim 8, wherein the authentication information further includes at least one of: a payment card identifier, a payment card number, an account number, an account identifier, an issuer identifier, or biometric data.

12. The method of claim 8, wherein the modulated signal generator is operable to:
    generating, by the modulated signal generator, an authentication signal in response to an authentication control signal received from the logic circuit, wherein the authentication signal is a modulated radio frequency signal containing an encrypted message including information usable to authenticate that the wearable device is associated with a payment account; and
    outputting, the authentication signal from the antenna to a biological medium of a wearer of the wearable device to complete a purchase transaction.

13. The method of claim 8, wherein the wearable device is a ring, eyeglasses, a necklace, or a wristwatch.

\* \* \* \* \*